United States Patent
Alvarez-Icaza et al.

(10) Patent No.: US 11,295,203 B2
(45) Date of Patent: Apr. 5, 2022

(54) OPTIMIZING NEURON PLACEMENT IN A NEUROMORPHIC SYSTEM

(71) Applicant: INTERNATIONAL BUSINESS MACHINES CORPORATION, Armonk, NY (US)

(72) Inventors: Rodrigo Alvarez-Icaza, Mountain View, CA (US); Pallab Datta, San Jose, CA (US); Jeffrey A. Kusnitz, Campbell, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 702 days.

(21) Appl. No.: 15/220,578

(22) Filed: Jul. 27, 2016

(65) Prior Publication Data
US 2018/0032856 A1    Feb. 1, 2018

(51) Int. Cl.
*G06N 3/063* (2006.01)
*G06N 3/04* (2006.01)

(52) U.S. Cl.
CPC ............. *G06N 3/063* (2013.01); *G06N 3/049* (2013.01)

(58) Field of Classification Search
CPC .. G06N 3/02; G06N 3/08; G06N 3/10; G06N 3/0635; G06N 3/049; G06N 3/063; G06K 9/4671; G06K 9/007; G01C 21/32; G08G 1/096811; G08G 1/096838; G08G 1/096883
See application file for complete search history.

(56) References Cited

U.S. PATENT DOCUMENTS

| | | | | |
|---|---|---|---|---|
| 5,687,286 A * | 11/1997 | Bar-Yam | ................. | G06K 9/62 704/232 |
| 7,283,905 B1 * | 10/2007 | Beesley | ............. | G01C 21/3492 340/995.13 |
| 8,909,576 B2 * | 12/2014 | Akopyan | ............... | G06N 3/049 706/27 |
| 2013/0198121 A1 | 8/2013 | Modha et al. | | |
| 2014/0052679 A1 | 2/2014 | Sinyavskiy et al. | | |
| 2014/0229411 A1 | 8/2014 | Richert et al. | | |
| 2015/0106315 A1 * | 4/2015 | Birdwell | ................. | G06F 16/22 706/25 |

OTHER PUBLICATIONS

Hau Chen "FPGA Based Multi-Core Architectures for Deep Learning Networks" pp. 1-42 (Year: 2015).*

(Continued)

*Primary Examiner* — Ann J Lo
*Assistant Examiner* — Van C Mang
(74) *Attorney, Agent, or Firm* — Erik A. Huestis; Stephen J. Kenny; Foley Hoag, LLP

(57) ABSTRACT

Neuron placement in a neuromorphic system to minimize cumulative delivery delay is provided. In some embodiments, a neural network description describing a plurality of neurons is read. A relative delivery delay associated with each of the plurality of neurons is determined. An ordering of the plurality of neurons is determined to optimize cumulative delivery delay over the plurality of neurons. An optimized neural network description based on the ordering of the plurality of neurons is written.

16 Claims, 7 Drawing Sheets

(56) References Cited

OTHER PUBLICATIONS

Dmitri Yudanov "GPU-Based Simulation of Spiking Neural Networks with Real-Time Performance & High Accuracy" IEEE, 2010 (Year: 2010).*
Cheung, "A Large-Scale Spiking Neural Network Accelerator for FPGA Systems" pp. 113-120 (Year: 2012).*
Andrew Cassidy "Cognitive Computing Building Block: A Versatile and Efficient Digital Neuron Model for Neurosynaptic Cores", IEEE (Year: 2014).*
Tarek Taha "Memristor Crossbar Based Multicore Neuromorphic Processors" IEEE, 2014 (Year: 2014).*
Brown, "SpiNNaker: The Design Automation Problem", 2014 (Year: 2014).*
Katre, "Policies for Migration of Real-Time Tasks in Embedded Multi-Core Systems", 2009 (Year: 2009).*
Paul Merolla, "A million spiking-neuron integrated circuit with a scalable communication network and interface", 2014 (Year: 2014).*
"Neural Network Program and Method to Improve Response Time for Web to Host TN3270 and TN5250 Sessions," Nov. 9, 2005, IBM.
Cheung, K. et al.,"A Large-scale spiking neural network accelerator for FPGA systems" (2012) AN-13017357.

\* cited by examiner

OPTIMIZING NEURON PLACEMENT IN A NEUROMORPHIC SYSTEM

BACKGROUND

Embodiments of the present invention relate to optimizing neuron placement in a neuromorphic system, and more specifically, to arranging neurons to minimize cumulative delivery delay.

BRIEF SUMMARY

According to one embodiment of the present invention, a method of and computer program product for optimizing neuron placement in a neuromorphic system are provided. A neural network description describing a plurality of neurons is read. A relative delivery delay associated with each of the plurality of neurons is determined. An ordering of the plurality of neurons is determined to optimize cumulative delivery delay over the plurality of neurons. An optimized neural network description based on the ordering of the plurality of neurons is written.

BRIEF DESCRIPTION OF THE SEVERAL VIEWS OF THE DRAWINGS

FIG. 3 depicts an exemplary core placement process according to embodiments of the present disclosure.

DETAILED DESCRIPTION

Figure 1:
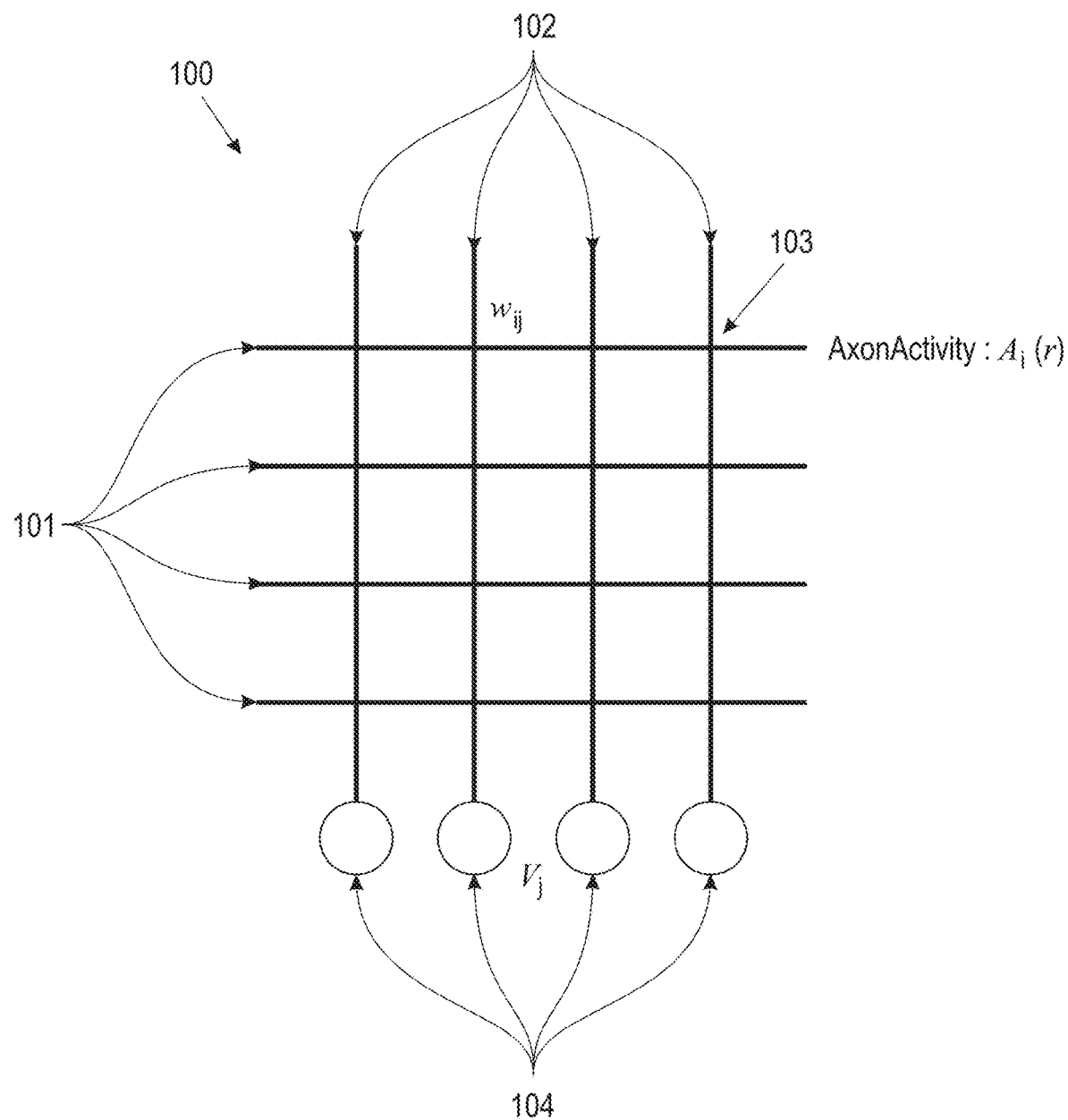
FIG. 1 depicts a neurosynaptic core according to embodiments of the present disclosure.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

In certain exemplary neuromorphic systems based on TrueNorth, each core has 256 neurons and 256 synapses. Where 1 ms is allocated per tick, this leaves a maximum processing time of 3.9 µs per neuron (3.9 µs*256≈1 ms). However, in various such embodiments, actual neuron processing time is only about 60 ns. In various embodiments, a limited number of synapses are active per tick.

Accordingly, various embodiments of the present disclosure leverage the processing order to optimize neuron placement. In some embodiments, the amount of time a spike will require to travel from its source neuron to its destination axon is computed. The neurons of each core may then be reordered such that those neurons whose spikes require the greatest time to travel (and thus have the longest delivery delay) are placed earliest in the processing sequence to improve the likelihood that their generated spikes arrive at their destinations within the allotted time. For example, a first neuron may have the longest distance to travel, and so may require the majority of the 1 millisecond tick to arrive at its destination, thus having the longest delivery delay. In some embodiments, any programmatic delay associated with a neuron (software delay) is also weighed. These neurons may be resorted as necessary, giving priority to those that have shorter delays.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar. In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

In some embodiments, a program reads a neural network (model file) and a placement file (description of the physical placement of each neurosynaptic core in the network). The time required for each neuron on each core to travel to its destination axon is computed. The program then generates a new network model file maintaining the original model's functionality. In the replacement network, the neurons of each core are placed in a sorted manner to improve the real-time delivery guarantee of spikes within the millisecond delivery window. The exact formulation of this problem can be solved using ILP (integer linear programming) formulation. ILP may be costly to model, solve and deploy in real-time. Thus, the present disclosure provides various heuristic approaches.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 synapses, 256 axons, and 256 neurons. In such embodiments, there are 256×256=65,536 synapses. Information flows from axons 101 to the neurons 104, modulated by the synapses 103.

Figure 2:
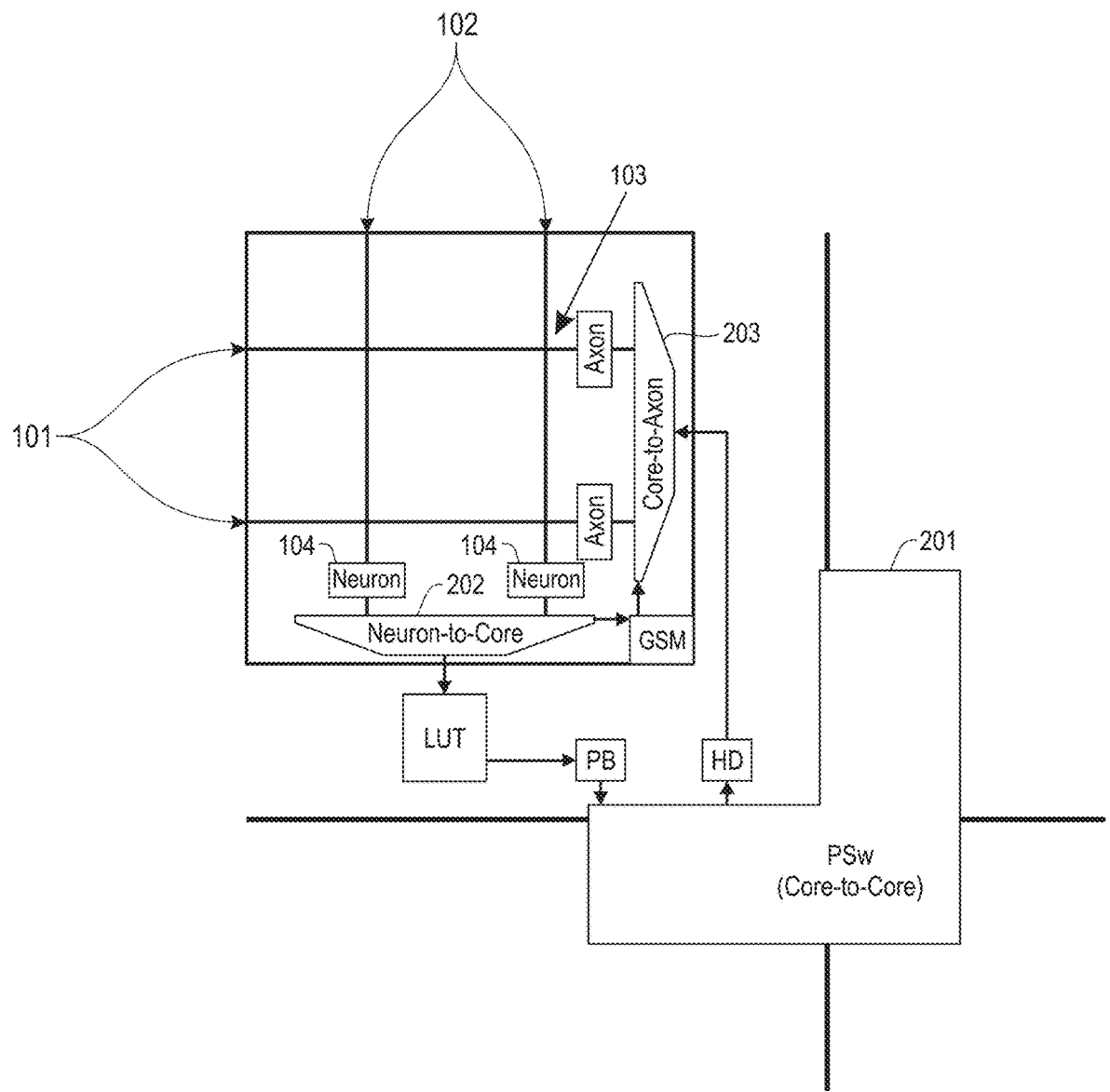
FIG. 2 depicts a neurosynaptic core and mesh router according to embodiments of the present disclosure.

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are physical. Long-distance connectivity is logical. An exemplary embodiment is depicted in FIG. 2. Mesh router 201 provides communication between cores. Also on a given core, neuron to core 202 and core to axon 203 communication links are provided.

Figure 3:
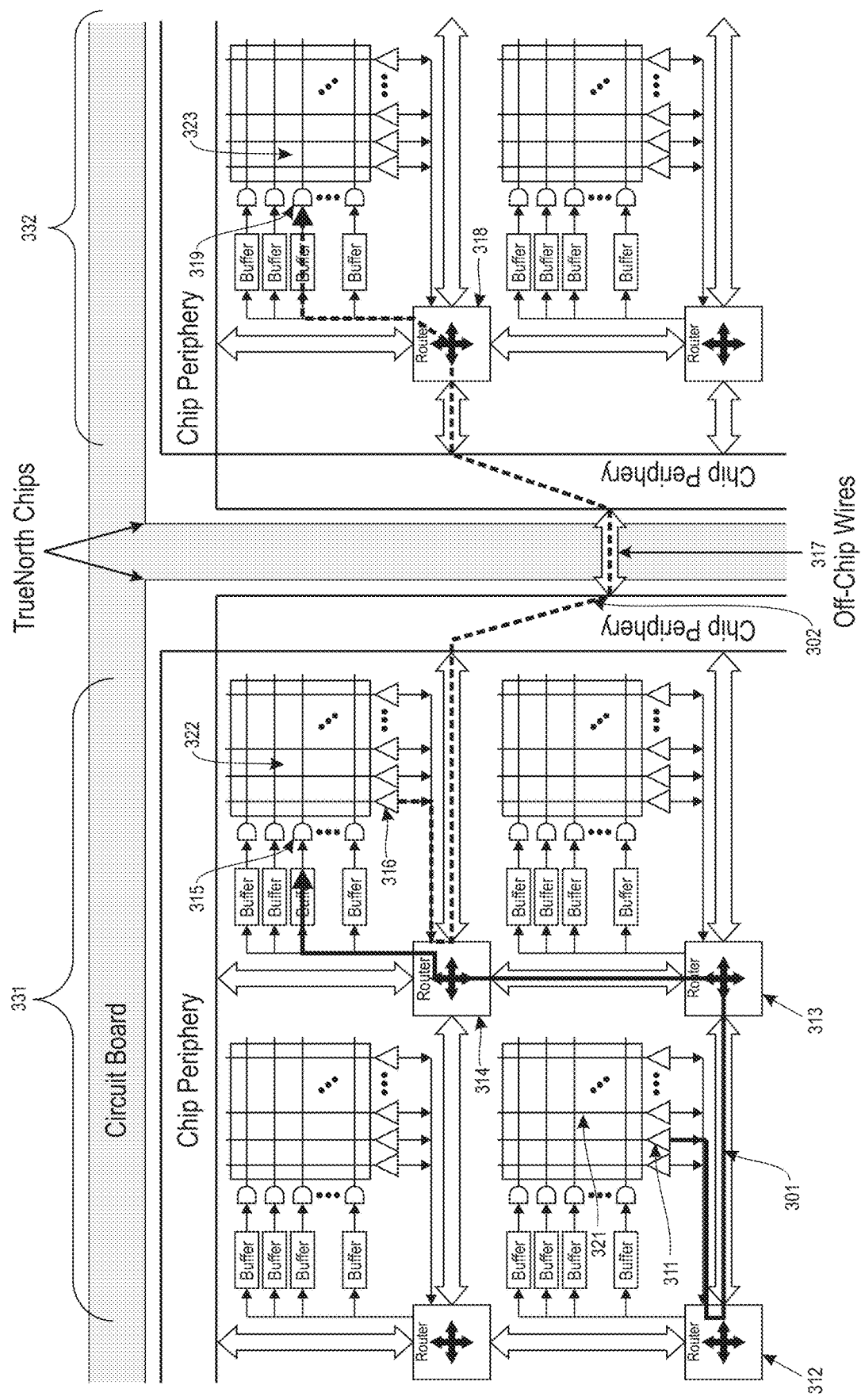
FIG. 3 depicts an exemplary neurosynaptic system comprising multiple cores on multiple chips according to embodiments of the present disclosure

Referring to FIG. 3, an exemplary network of multiple cores on multiple chips is illustrated. In some embodiments, the chips are TrueNorth chips. Exemplary path 301 runs from neuron 311 on core 321 through routers 312, 313, 314 to axon 315 on core 322. In comparison, path 302 runs from neuron 316 on core 322 through router 314, and then off of chip 331. Path 302 traverses inter-chip wires 317 to enter chip 332 before passing through router 318 to axon 319 on core 323.

Figure 4:
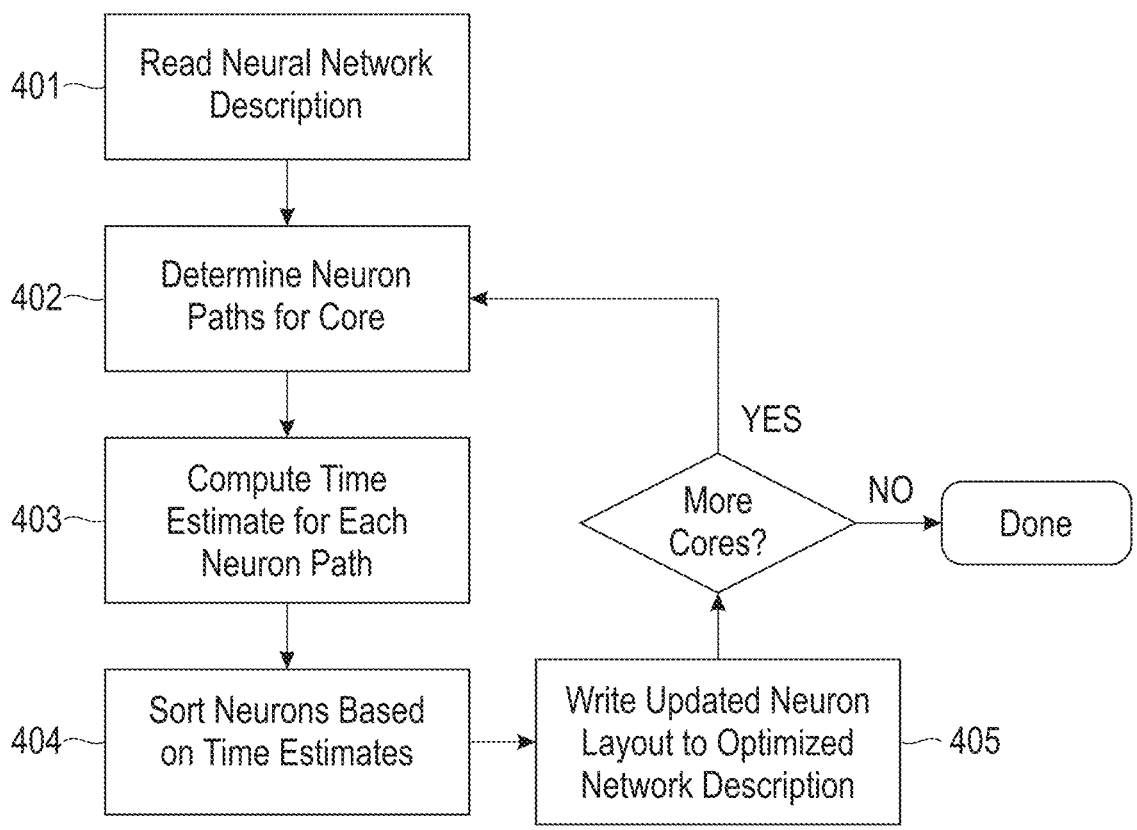
FIG. 4 illustrates an exemplary process for optimizing neuron placement with respect to spike delivery reliability according to embodiments of the present disclosure

Referring now to FIG. 4, an exemplary process for optimizing neuron placement is illustrated. A neural network description is read 401. In some embodiments, the neural network description comprises a model file describing a network and a placement file describing the relative placement of cores. For example, in a TrueNorth implementation, the model file may be an un-optimized model file describing a TrueNorth network and the placement file may define where each core from the model will be placed in the TrueNorth hardware.

For each neurosynaptic core in the network, the outgoing neuron paths are determined 402. In particular, for each neuron in a given core, the path that neuron's spike travels to its destination axon is determined from the network description. A relative time estimate is computed for each path 403. In some embodiments, the relative time estimate is computed according to Equation 1, in which X and Y denote the positions of the source and destination chips in a grid, and x and y denote the positions of the source and destination cores in a chip. In some embodiments, the crossChipPenalty is a constant equal to 32,000. However, it will be appreciated that a range of constants are suitable in various embodiments. In some embodiments, a cross-core delay is also included. In some exemplary embodiments, this cross-core delay is 63. It will be appreciated that various other heuristics for delivery delay may be adopted in various alternative embodiments according to the present disclosure.

$$crossChipPenalty*$$  Equation 1

$$(|X_{srcChip} - X_{destChip}| + |Y_{srcChip} - Y_{destChip}|) +$$

$$\begin{cases} 63 - x_{srcCore} + x_{destCore}, & X_{srcChip} < X_{destChip} \\ 63 + x_{srcCore} - x_{destCore}, & X_{srcChip} \geq X_{destChip} \end{cases} +$$

$$\begin{cases} 63 - y_{srcCore} + y_{destCore}, & Y_{srcChip} < Y_{destChip} \\ 63 + y_{srcCore} - y_{destCore}, & Y_{srcChip} \geq Y_{destChip} \end{cases}$$

Based on the time for each path, the corresponding neurons are sorted 404. In some embodiments, the neurons are sorted in descending order by time estimate. In other embodiments, the neurons are additionally weighted by spiking frequency. In such embodiments, neurons which fire less frequently are weighted lower than neurons which fire frequently. For example, the time estimate may be multiplied by each neuron's firing frequency prior to sorting.

Based on the sorted neurons, an optimized description of the core is written 405. In some embodiments, the optimized description is written to an optimized model file. In some embodiments, the optimized model file is then used to perform layout of neurons on a physical core.

Referring back to FIG. 3, path 301 moves from core 321 at position {1, 2} to core 322 at position {2, 1}, both on the same chip 331. Accordingly, the relative time estimate for neuron 311 according to Equation 1 would be 63+1−2+63+2−1=126 according to certain exemplary embodiments. Similarly, path 302 moves from core 322 at position {2, 1} on chip 331 to core 323 at position {1, 1} on chip 332. Accordingly, the relative time estimate for neuron 316 according to Equation 1 would be crossChipPenalty+63−1+1+63+2−1=crossChipPenalty+127.

The optimization of hops according to the present disclosure directly translates to energy reduction. Moreover, the reliable arrival of spikes at destination axons within the 1 ms tick window is critical for real time operation of systems integrating neuromorphic cores such as those described herein. In multi-chip systems, the need for prompt arrival is particularly acute, as the potential cross-chip delay can mount quickly. Similarly, prompt arrival is important when running a neuromorphic system faster than real time. Application of the techniques described herein alleviates routing congestion in a multi-chip system.

Figure 5:
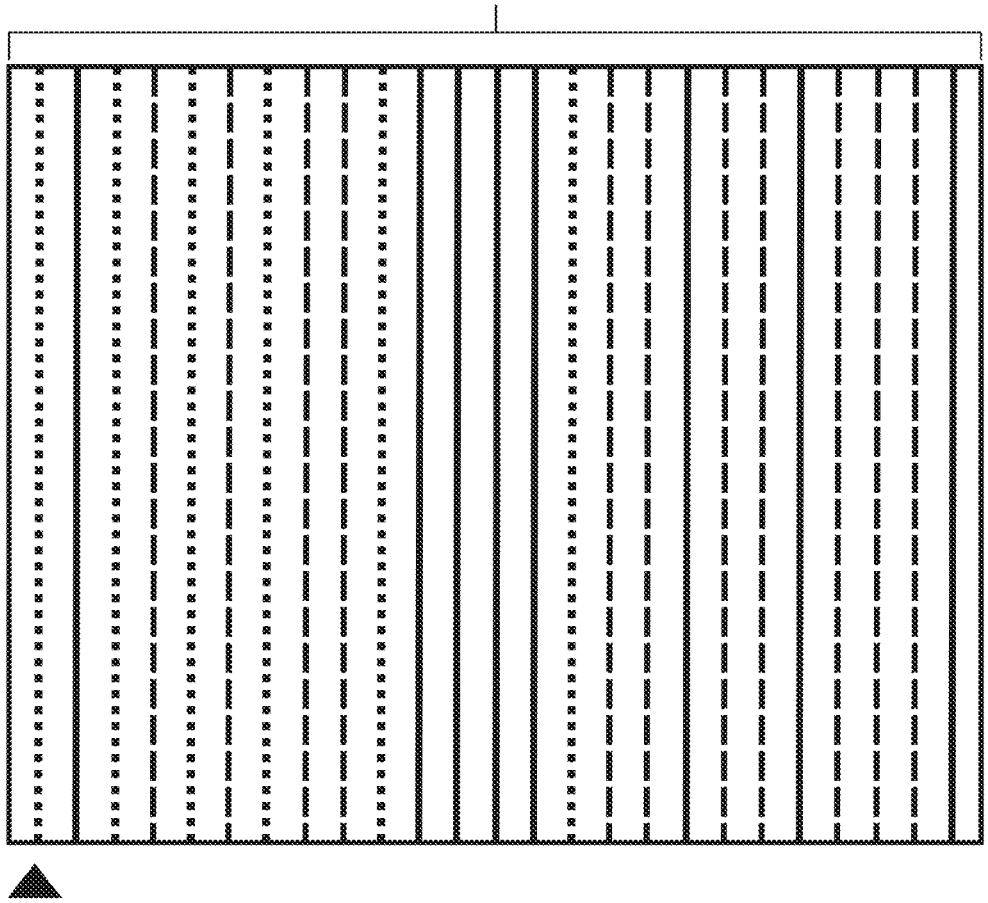
FIG. 5 depicts an exemplary neuron layout according to embodiments of the present disclosure.
Figure 6:
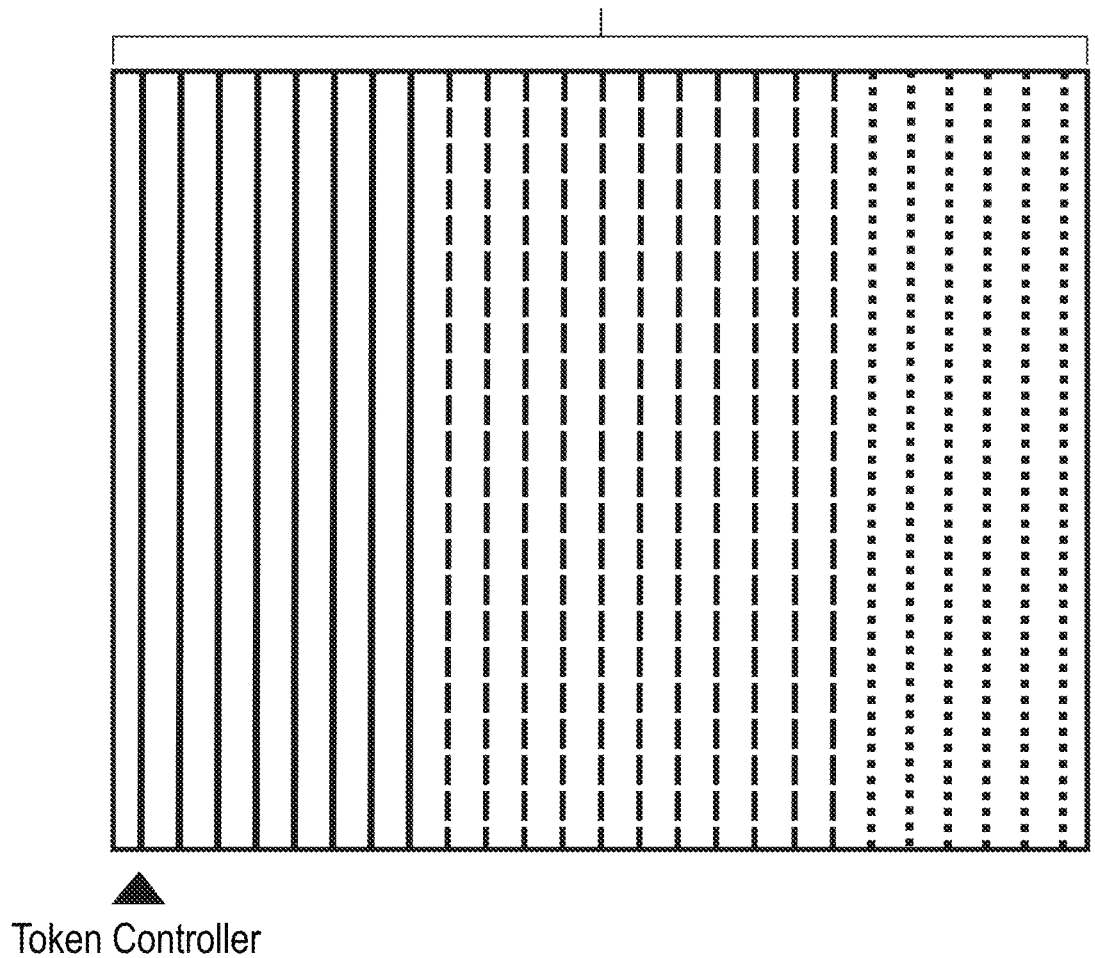
FIG. 6 depicts an exemplary optimized neuron layout according to embodiments of the present disclosure.

Referring now to FIGS. 5-6, exemplary neuron layouts are depicted. In FIG. 5 unsorted neurons are depicted. FIG. 6 shows neurons sorted according to embodiments of the present disclosure. As shown, the longest delay neurons (solid lines) are placed first, the medium delay neurons (dashed lines) are placed seconds, and the short delay (dotted lines) neurons are placed last.

Figure 7:
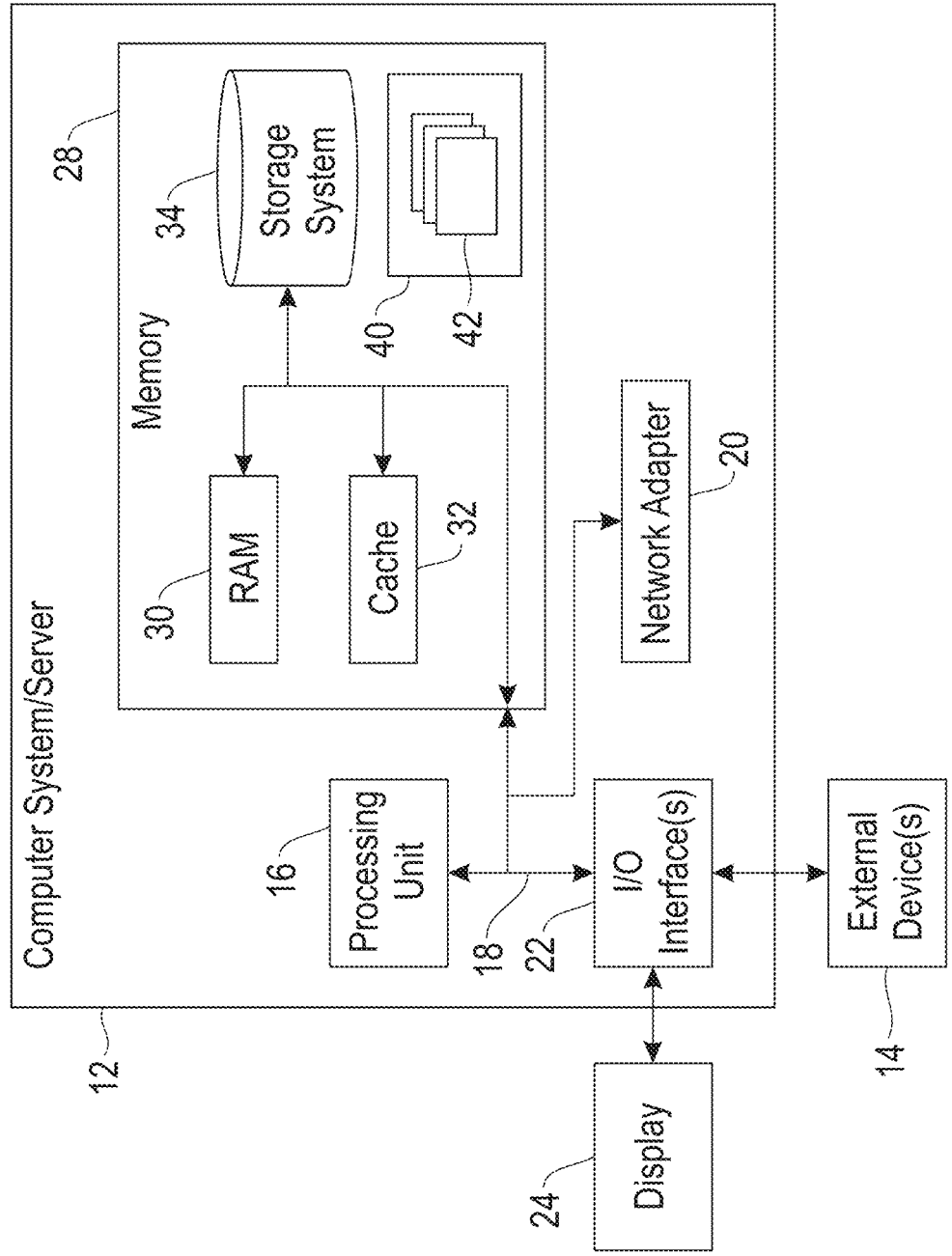
FIG. 7 depicts a computing node according to an embodiment of the present invention.

Referring now to FIG. 7, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing neuron placement in a neuromorphic system, the method comprising:
reading a neural network description describing a plurality of neurons, wherein the neural network description describes a plurality of cores in a neuromorphic system, each of the plurality of cores comprising some of the plurality of neurons, the neural network description further describing a physical placement of each of the plurality of cores on one or more chip;
determining a relative delivery delay associated with each of the plurality of neurons according to the physical placement of each of the plurality of cores, wherein determining the relative delivery delay associated with each of the plurality of neurons comprises:
  determining a source core on a source chip for one of the plurality of neurons,
  determining a destination core on a destination chip for the destination axon corresponding to the one of the plurality of neurons, and
  applying a first penalty to the relative delivery delay corresponding to the distance between the source chip and the destination chip;
determining an ordering of the plurality of neurons to reduce cumulative delivery delay over the plurality of neurons; and
writing a new neural network description based on the ordering of the plurality of neurons, the plurality of neurons being reordered in the plurality of cores between the neural network description and the new neural network description.

2. The method of claim 1, wherein determining the relative delivery delay associated with each of the plurality of neurons comprises:
  determining a destination axon for each of the plurality of neurons.

3. The method of claim 2, wherein determining the relative delivery delay associated with each of the plurality of neurons further comprises:
  determining a source core of one of the plurality of neurons;
  determining a destination core of the destination axon corresponding to the one of the plurality of neurons.

4. The method of claim 3, wherein determining the relative delivery delay associated with each of the plurality of neurons further comprises:
  determining a distance between the source core and the destination core.

5. The method of claim 1, wherein the ordering is by decreasing delivery delay of the plurality of neurons.

6. The method of claim 1, wherein determining an ordering of the plurality of neurons comprises weighting each of the plurality of neurons by its spiking frequency.

7. The method of claim 1, wherein the cumulative delivery delay is less than or equal to 1 ms.

8. A computer program product for optimizing neuron placement in a neuromorphic system, the computer program product comprising a computer readable storage medium having program instructions embodied therewith, the program instructions executable by a processor to cause the processor to perform a method comprising:
  reading a neural network description describing a plurality of neurons, wherein the neural network description describes a plurality of cores in a neuromorphic system, each of the plurality of cores comprising some of the plurality of neurons, the neural network description further describing a physical placement of each of the plurality of cores on one or more chip;
  determining a relative delivery delay associated with each of the plurality of neurons according to the physical placement of each of the plurality of cores, wherein determining the relative delivery delay associated with each of the plurality of neurons comprises:
    determining a source core on a source chip for one of the plurality of neurons,
    determining a destination core on a destination chip for the destination axon corresponding to the one of the plurality of neurons, and
    applying a first penalty to the relative delivery delay corresponding to the distance between the source chip and the destination chip;
  determining an ordering of the plurality of neurons to reduce cumulative delivery delay over the plurality of neurons; and
  writing a new neural network description based on the ordering of the plurality of neurons, the plurality of neurons being reordered in the plurality of cores between the neural network description and the new neural network description.

9. The computer program product of claim 8, wherein determining the relative delivery delay associated with each of the plurality of neurons comprises:
  determining a destination axon for each of the plurality of neurons.

10. The computer program product of claim 9, wherein determining the relative delivery delay associated with each of the plurality of neurons further comprises:
  determining a source core of one of the plurality of neurons;
  determining a destination core of the destination axon corresponding to the one of the plurality of neurons.

11. The computer program product of claim 10, wherein determining the relative delivery delay associated with each of the plurality of neurons further comprises:
  determining a distance between the source core and the destination core.

12. The computer program product of claim 8, wherein the ordering is by decreasing delivery delay of the plurality of neurons.

13. The computer program product of claim 8, wherein determining an ordering of the plurality of neurons comprises weighting each of the plurality of neurons by its spiking frequency.

14. The computer program product of claim 8, wherein the cumulative delivery delay is less than or equal to 1 ms.

15. The method of claim 1, wherein determining the relative delivery delay comprises computing a time estimate for each of a plurality of neuron paths described by the neural network description.

16. The computer program product of claim 8, wherein determining the relative delivery delay comprises computing a time estimate for each of a plurality of neuron paths described by the neural network description.

* * * * *